(12) United States Patent
Wang (10) Patent No.: US 7,597,022 B2
(45) Date of Patent: Oct. 6, 2009

(54) EASY RELEASE MECHANISM AT PARK POSITION FOR AUTOMATIC TRANSMISSION SHIFTER

(75) Inventor: Yong Qiang Wang, Rochester Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 237 days.

(21) Appl. No.: 11/382,410

(22) Filed: May 9, 2006

(65) Prior Publication Data

US 2007/0261510 A1  Nov. 15, 2007

(51) Int. Cl.
    *B60K 20/00*  (2006.01)
(52) U.S. Cl. .................................. 74/473.21
(58) Field of Classification Search ........... 74/473.1, 74/473.24, 473.25, 473.26, 473.27, 473.3, 74/567, 569
    See application file for complete search history.

(56) References Cited

U.S. PATENT DOCUMENTS

| | | | | |
|---|---|---|---|---|
| 3,228,508 A | * | 1/1966 | McCormick | 400/375 |
| 3,673,620 A | * | 7/1972 | Saunders | 5/611 |
| 3,724,679 A | * | 4/1973 | Brownell et al. | 212/278 |
| 3,857,187 A | * | 12/1974 | Jensen et al. | 33/27.11 |
| 4,346,945 A | * | 8/1982 | Tsuboi | 384/55 |
| 4,375,195 A | * | 3/1983 | Tsuboi | 104/246 |
| 4,850,238 A | * | 7/1989 | Inoue | 74/473.15 |
| 4,880,092 A | * | 11/1989 | Kito et al. | 477/96 |
| 5,062,509 A | | 11/1991 | Carpenter et al. | |
| 5,309,783 A | | 5/1994 | Dolittle et al. | |
| 5,314,049 A | | 5/1994 | Nordstrom | |
| 5,372,051 A | * | 12/1994 | Kanematsu et al. | 74/473.25 |
| 5,505,013 A | * | 4/1996 | Gois | 43/14 |
| 5,540,180 A | * | 7/1996 | Kataumi et al. | 116/28.1 |
| 5,642,941 A | * | 7/1997 | Mouezy | 384/57 |
| 5,651,293 A | * | 7/1997 | Ebenstein | 74/473.3 |
| 5,682,789 A | * | 11/1997 | DeCrouppe et al. | 74/335 |
| 5,791,196 A | * | 8/1998 | Skogward et al. | 74/483 R |
| 5,836,209 A | * | 11/1998 | Ebenstein | 74/473.21 |
| 5,875,684 A | * | 3/1999 | Bravo | 74/473.18 |
| 5,934,408 A | * | 8/1999 | Flux | 182/5 |
| 6,105,452 A | * | 8/2000 | Bravo | 74/473.18 |
| RE37,209 E | * | 6/2001 | Hensley et al. | 602/26 |
| 6,295,886 B1 | | 10/2001 | Russell | |

(Continued)

FOREIGN PATENT DOCUMENTS

JP          10024750 A  *  1/1998

*Primary Examiner*—Richard W L Ridley
*Assistant Examiner*—Phillip Johnson
(74) *Attorney, Agent, or Firm*—Porter Wright Morris & Arthur LLP; Richard M. Mescher; Dean B. Watson (57) ABSTRACT

A shifter lever assembly includes a base, a shifter lever movable relative to the base along a shift path, and at least one gate defining a gear position along the shift path. A release mechanism includes a gate pin movable along a linear path between a locked position wherein the gate pin cooperates with the at least one gate to secure the shifter lever in the gear position and an unlocked position wherein the shifter lever is movable from the gear position along the shift path, an actuator operatively coupled to the gate pin to selectively move the gate pin from the locked position to the unlocked position, and at least one rotatable roller located between the gate pin and the at least one gate.

16 Claims, 5 Drawing Sheets

U.S. PATENT DOCUMENTS

| | | | |
|---|---|---|---|
| 6,301,987 B1 * | 10/2001 | Chakri et al. | 74/473.3 |
| 6,339,968 B1 * | 1/2002 | Nagashima | 74/473.25 |
| 6,382,046 B1 | 5/2002 | Wang | |
| 6,520,043 B1 * | 2/2003 | Wang | 74/473.15 |
| 6,568,294 B2 * | 5/2003 | Jezewski | 74/473.18 |
| 6,622,583 B2 | 9/2003 | Wang | |
| 6,655,227 B2 * | 12/2003 | Aoyama et al. | 74/335 |
| 6,732,847 B1 | 5/2004 | Wang | |
| 6,865,967 B2 * | 3/2005 | Shioji et al. | 74/473.23 |
| 6,923,084 B2 * | 8/2005 | Kramer et al. | 74/473.33 |
| 7,124,874 B2 | 10/2006 | Wang | |
| 7,270,623 B2 | 9/2007 | Wang | |
| 2002/0097926 A1 * | 7/2002 | Mochizuki | 384/58 |
| 2005/0022622 A1 * | 2/2005 | Mitteer | 74/473.3 |
| 2006/0137829 A1 * | 6/2006 | Tran | 157/1.17 |

* cited by examiner

Fig. 6

EASY RELEASE MECHANISM AT PARK POSITION FOR AUTOMATIC TRANSMISSION SHIFTER

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a shifter for controlling automatic transmissions of motor vehicles and, more particularly, to a release mechanism for selectively realeasing a shifter lever from a park position so that the shifter lever can be moved to other gear positions.

BACKGROUND OF THE INVENTION

In a motor vehicle equipped with an automatic transmission, a shifter lever is typically pivotable over a series of positions representative of desired transmission gears such as, for example, park (P), reverse (R), neutral (N), drive (D), and low gears (1, 2). The shifter lever is connected to the motor vehicle transmission by a suitable mechanical and/or electronic operating linkage to effect actuation of the transmission to the selected gear when the shifter lever is pivoted to the transmission gear's representative position. The shifter lever assembly is typically provided with a detent or release assembly which releasably holds or retains the shifter lever in the park position to prevent inadvertent movement from the park position. The release assembly typically includes a mechanical actuator such as a push button which is manually operated to release the detent assembly and permit manual pivoting of the shifter lever from the park position to a new position.

Typically, a gate pin engages a gate to prevent movement of the shifter lever out of the park position. The push button is typically located at a knob located at the top of the shift lever. The operator grasps the knob, actuates of the push button to move the gate pin out of engagement with the gate, and pivots the shifter lever out of the park position by pulling on the knob. The knob is then released when the shifter lever is in the desired gear position These prior shifter lever assemblies generally perform their intended purpose in an adequate manner. A pre-load force is placed on the knob and shifter lever, however, when the operator's hand is placed on the knob. A reaction force of the pre-load force creates friction between the gate pin and gates. This friction causes the need for increased effort when pushing the push-button to move the gate pin out of engagement with the gate. The larger the preload placed on the shifter lever, the more difficult it is to actuate the push button to release the gate pin from the gate. This situation is even worse for instrument panel (IP) mounted shifters because in most cases the driver has to stretch to reach the shifter lever knob when the shifter lever is in the park position. If the shifter lever is pulled too hard, the driver may not even be able to depress the push button because of the high friction. Accordingly, there is a need in the art for a shifter with an improved release mechanism.

SUMMARY OF THE INVENTION

The present invention provides a shifter lever mechanism which overcomes at least some of the above-noted problems of the related art. According to the present invention, a shifter lever assembly comprises, in combination, a base, a shifter lever movable relative to the base along a shift path, and at least one gate defining a gear position along the shift path. A release mechanism includes a gate pin movable along a linear path between a locked position wherein the gate pin cooperates with the at least one gate to secure the shifter lever in the gear position and an unlocked position wherein the shifter lever is movable from the gear position along the shift path, an actuator operatively coupled to the gate pin to selectively move the gate pin from the locked position to the unlocked position, and at least one rotatable roller located between the gate pin and the at least one gate.

According to another aspect of the present invention, a shifter lever assembly comprises, in combination, a base, a shifter lever movable relative to the base along a shift path and having a knob at a top end thereof, and at least one gate defining a gear position along the shift path. A release mechanism includes a gate pin movable along a linear path between a locked position wherein the gate pin cooperates with the at least one gate to secure the shifter lever in the gear position and an unlocked position wherein the shifter lever is movable from the gear position along the shift path, a manual actuator operatively coupled to the gate pin to selectively move the gate pin from the locked position to the unlocked position, and at least one rotatable roller located between the gate pin and the at least one gate. The manual actuator includes a push button located at the knob that cooperates with an actuator rod carrying the gate pin to move the gate pin from the locked position to the unlocked position when the push button is depressed and a spring member that resiliently biases the actuator rod such that the gate pin is biased to the locked position According to yet another aspect of the present invention, a shifter lever assembly comprises, in combination, a base, a shifter lever movable relative to the base along a shift path and having a knob at a top end thereof, and a gate defining a park gear position along the shift path. A release mechanism includes a gate pin movable along a linear path between a locked position wherein the gate pin cooperates with the gate to secure the shifter lever in the gear position and an unlocked position wherein the shifter lever is movable from the gear position along the shift path, a manual actuator operatively coupled to the gate pin to selectively move the gate pin from the locked position to the unlocked position, and a rotatable roller located between the gate pin and the gate. The manual actuator includes a push button located at the knob that cooperates with an actuator rod carrying the gate pin to move the gate pin from the locked position to the unlocked position when the push button is depressed and a spring member that resiliently biases the actuator rod such that the gate pin is biased to the locked position. The rotatable roller is rotatably secured to the gate and the gate pin engages the roller to provide rolling contact between the gate pin and the gate when the gate pin is moved from the locked position to the unlocked position while a preload force is applied to the shifter lever.

From the foregoing disclosure and the following more detailed description of various preferred embodiments it will be apparent to those skilled in the art that the present invention provides a significant advance in the technology and art of motor vehicle shifter lever assemblies. Particularly significant in this regard is the potential the invention affords for providing a high quality, reliable, low cost assembly which has a release assembly that requires a relatively small amount of effort to release the shifter lever from the park position regardless the amount of pre-load force applied to the shifter lever by the operator. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

It should be understood that the appended drawings are not necessarily to scale, presenting a somewhat simplified representation of various preferred features illustrative of the basic principles of the invention. The specific design features of a shifter lever assembly as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the shifter lever assembly illustrated in the drawings. In general, up or upward generally refers to an upward direction within the plane of the paper in FIG. 1 and down or downward generally refers to a downward direction within the plane of the paper in FIG. 1. Also in general, fore or forward refers to a direction toward the front of the vehicle, that is, generally toward the left within the plane of the paper in FIG. 1 and aft or rearward refers to a direction toward the rear of the vehicle, that is, generally toward the right within the plane of the paper in FIG. 1. Also in general, lateral or transverse refers to a side-to side direction of the vehicle, that is, generally a direction into and out of the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved shifter lever assemblies disclosed herein. The following detailed discussion of various alternative and preferred embodiments will illustrate the general principles of the invention with reference to a shifter lever mechanism for an automatic transmission and mounting to an instrument panel (IP) of a motor vehicle such as an automobile, sport utility vehicle (SUV), truck, van, recreational vehicle, crossover vehicle, or the like. Other embodiments suitable for other applications will be apparent to those skilled in the art given the benefit of this disclosure.

Figure 1:
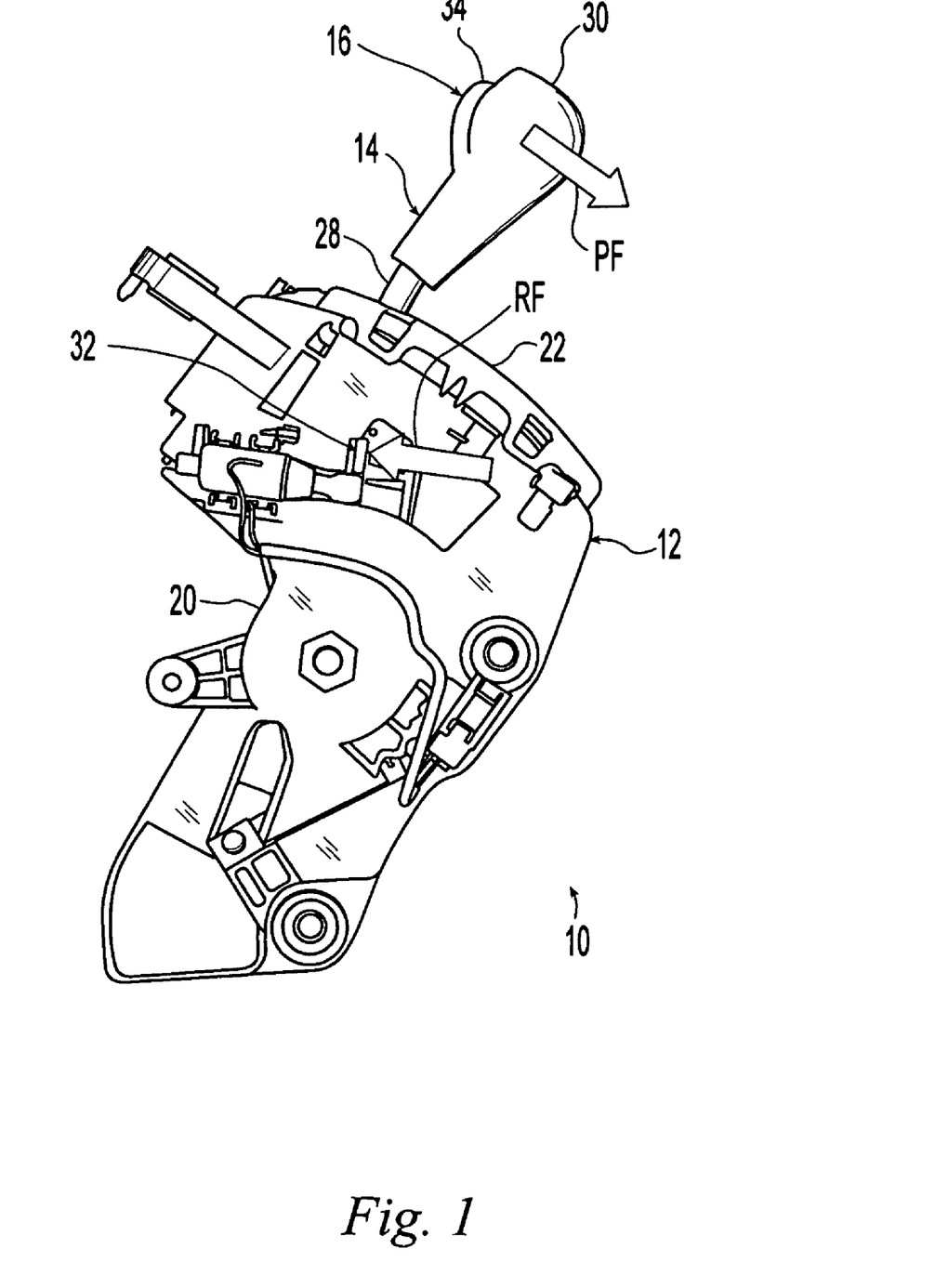
FIG. 1 is a side elevational view of a shifter lever assembly according to the present invention.
Figure 2:
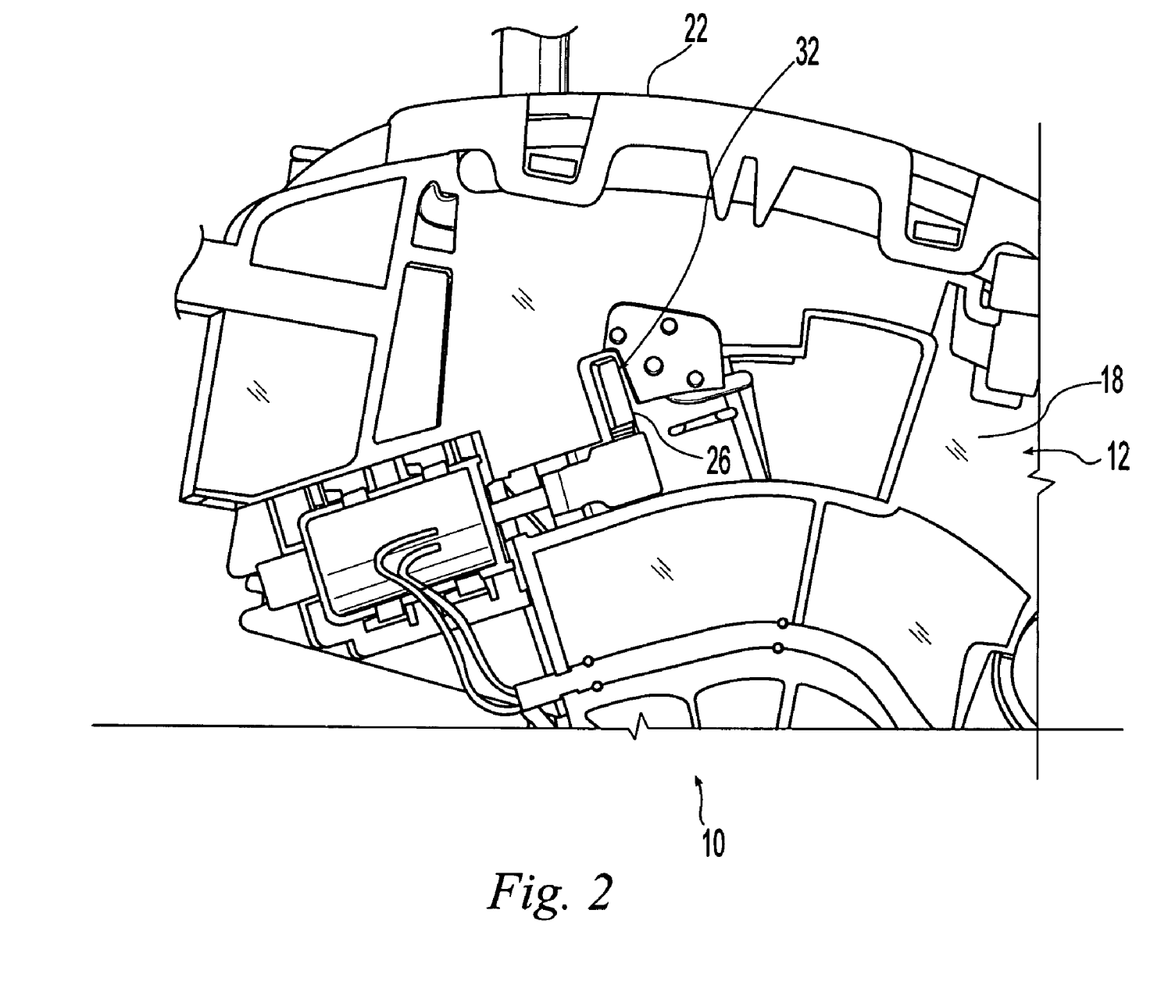
FIG. 2 is an enlarged, fragmented view showing a portion of FIG. 1 near a gate pin when the shifter lever is in a park position.
Figure 3:
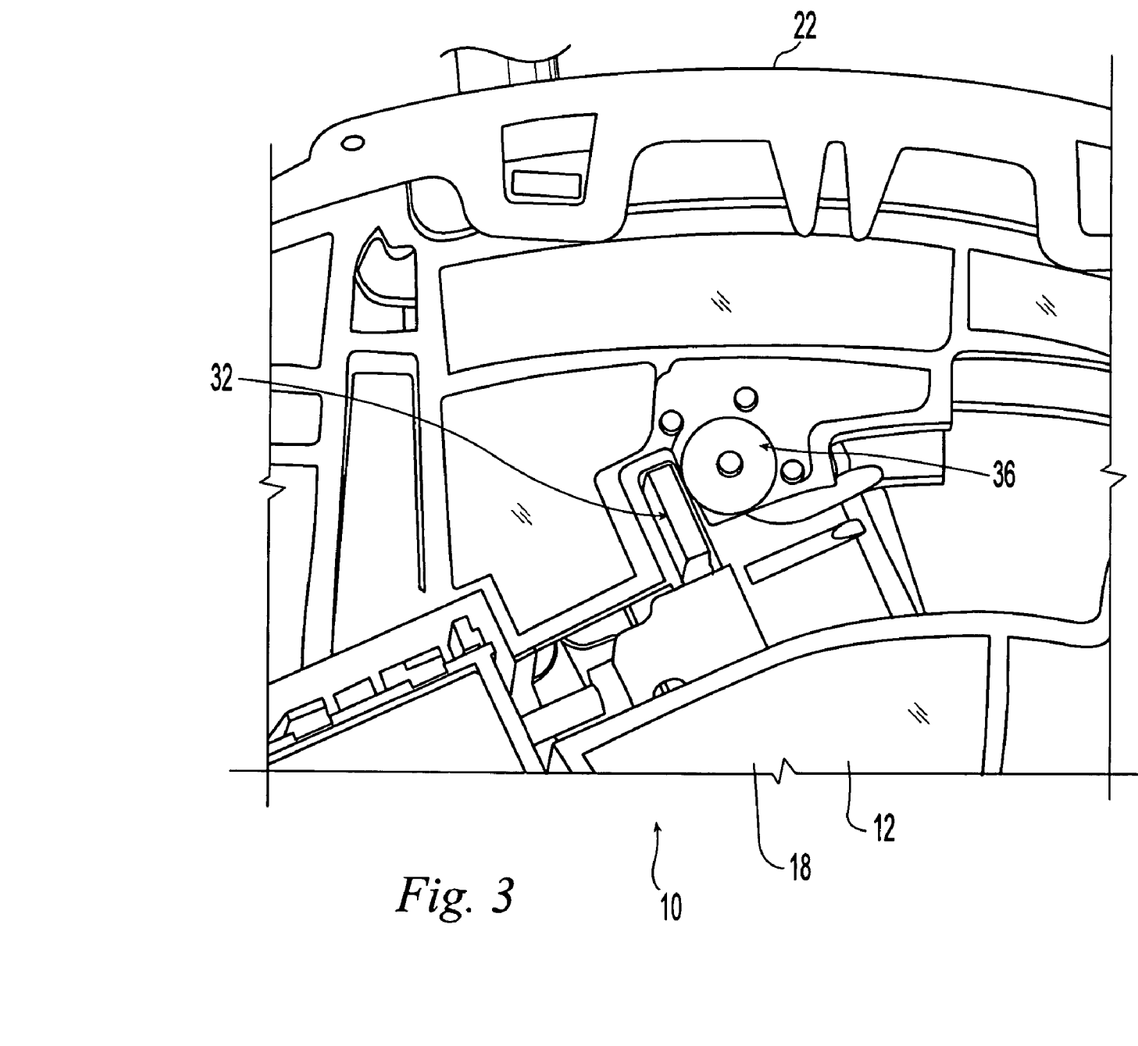
FIG. 3 is a further enlarged, fragmented view similar to FIG. 2 but wherein components are removed for clarity.

Referring now to the drawings, FIGS. 1 to 3 show a shifter lever assembly 10 for an automatic transmission according to a preferred embodiment of the present invention. The illustrated shifter lever assembly 10 includes a frame or base 12, a shifter lever 14 pivotably mounted to the base 12 and movable over a plurality of gear positions, and a manual release or detent mechanism 16 releasably holding the shifter lever assembly 10 in at least one of the plurality of gear positions against undesired or inadvertent movement to the other gear positions. The plurality of gear positions typically comprise park (P), reverse (R), neutral (N), drive (D), but any other suitable plurality of gear positions can alternatively be utilized within the scope of the present invention.

The illustrated base 12 is adapted to be attached to a fixed position on the motor vehicle instrument panel. It is noted, however, that the base 12 can alternatively be adapted to be attached in a fixed position on a motor vehicle floor, console, or the like. A pair of laterally spaced apart walls 18 is provided with concentric openings for pivotably mounting the shifter lever 14 therebetween as described in more detail hereinafter. The openings define a horizontal and laterally extending pivot axis 20 for the shifter lever 14. A cover 22 is provided at the top of the base 12 and extends about the shifter lever 14 such that only the upper end of the shift lever 14 can be seen. The cover 22 also preferably includes shift lever indicators for visually indicating the gear positions. The illustrated shifter lever assembly 10 is a straight line shifter assembly such that the shifter lever pivots along a straight line between the plurality of gear positions but it is noted that any other suitable type of shifter assembly can alternatively be utilized.

The illustrated base 12 forms a plurality detents or gates 24. The gates 24 correspond with the various gear positions in which the shifter lever 14 can be shifted to provide a desired gear at the transmission of the motor vehicle. The gates 24 can indicate the gear positions such as park (P), reverse (R), neutral (N), and drive (D). The gates 24 are sized shaped to cooperate with the release assembly 16 to limit movement of the shifter lever 14 as discussed in more detail hereinbelow. The illustrated forward most gate 24 generally forms a forward facing abutment or gate wall 26 to form the park position and selectively limit rearward movement of the shifter lever 14 to the other gates forming the other gear positions. The remainder of the gates 24 form rearward facing abutments or gate walls that limit forward movement shifter lever 14 and freely permit rearward movement of the shifter lever 14 to the remaining gates 24 and gear positions located rearward thereof. It is noted that the gates 24 can alternatively have any other suitable shapes and sizes.

The illustrated shifter lever 14 includes a post or lever 28 and a handle grip or knob 30. The lower end of the lever 28 is sized and shaped to extend between the walls 18 of the base 12 and is provided with a pivotable connection to the base 12. Pivotably connected to the base 12 in this manner, the shifter lever 14 is pivotable about the laterally extending pivot axis 20 relative to the base 12. The upper end of the lever 28 is preferably provided with the knob 30. The knob 30 is preferably provided with a shape to provide a suitable gripping surface for the hand of the operator. With the shifter lever 14 pivotably mounted to the base 12, the shifter lever 14 can be pivoted about the pivot axis 20 by manually applying a force to the pivot lever knob 30. The shifter lever 14 is suitably connected to the transmission of the motor vehicle such that movement the shifter lever 14 to the various positions causes the transmission to move to the corresponding gear. This connection can be mechanical or electronic.

Figure 4:
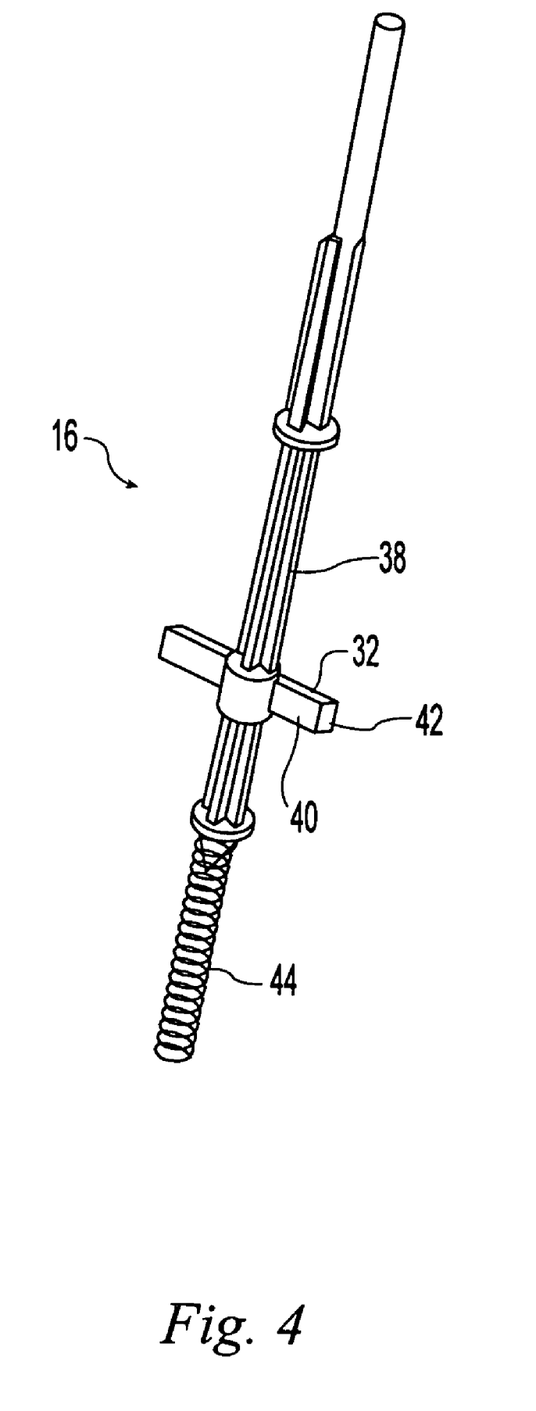
FIG. 4 is an enlarged perspective view of a portion of a release mechanism of the shifter lever assembly of FIGS. 1 to 3.
Figure 5:
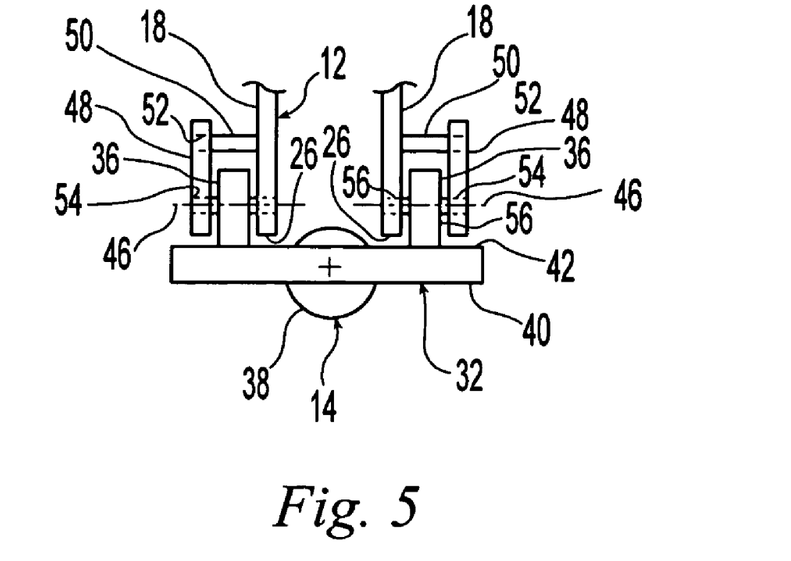
FIG. 5 is an enlarged, fragmented top plan view showing engagement of the gate pin with gate rollers of the shifter lever assembly of FIGS. 1 to 3, wherein components are removed for clarity.

The illustrated manual release or detent assembly 16 includes a gate pin 32 selectively movable into and out of engagement with the gates 24, an actuator 34 for selectively moving the gate pin 32, and at least one roller 36 for reducing friction between at least one of the gates 24 and the gate pin 32. As shown in FIGS. 4, and 5, the illustrated gate pin 32 laterally extends through an actuator rod 38 and is carried with the actuator rod 38 upon movement of the actuator rod 38. The illustrated gate pin 32 is rectangular-shaped in cross section having a height greater than its width. The illustrated gate pin 32 forms forward and rearward facing abutments or engagement surfaces 40, 42 which are substantially planar the engagement surfaces are sized and shaped to cooperate with the gates 24 as described in more detail hereinafter. The illustrated gate pin 32 extends through the actuator rod 38 to opposite sides of the shifter lever 14 to cooperate with the two sets of gates 24 on opposite sides of the shifter lever 14 but it is noted that the gate pin 32 can engage a single set of gates 24 if desired.

The elongate actuator rod 38 longitudinally extends within the hollow lever 28. A spring member 44 biases the actuator rod 38 in an upward direction. The illustrated spring member 44 is a compression coil spring located at the bottom end of the actuator rod 38 to act between the actuator rod 38 and the shifter lever 14 to resiliently bias the actuator rod 38 and the gate pin 32 carried therewith in an upward direction so that the gate pin 32 is in a locked position. It is noted that any other suitable type of spring member 44 can alternatively be utilized. When the shifter lever 14 is in its park position and the gate pin 32 is biased to its locked position, rearward pivoting of the shifter lever 14 to the other gear positions is prevented because of the interference between the gate pin 32 and the park gate 24.

The illustrated actuator 34 is a manual actuator in the form of a push button but any other suitable actuator 34 can be utilized within the scope of the present invention. The illustrated push button 34 is operably secured to and carried by the shifter lever knob 30 so that the operator can actuate the push button 34 and pivot the shift lever 14 with a single hand grasping the knob 30. The push button 34 is sized and shaped so that actuation of the push button 34 presses the actuator rod 38 in a downward direction against the bias of the spring member 44. The downward movement of the actuator rod 38 moves the gate pin 32 in a downward direction therewith so that the gate pin 38 is moved from its locked position to an unlocked position out of the park gate 24. With the gate pin 32 moved out of the park gate 24 the operator can pivot the shift lever 14 in a rearward direction to one of the other gear positions.

The at least one wheel or roller 36 is provided between the gate pin 32 and the park gate wall 26 so that there is at least partially rolling contact therebetween as the gate pin 32 is moved from its lock position to its unlocked position when the is rearward loading on the shift lever 14. This rolling contact reduces friction therebetween and thus reduces the amount of force or effort required by the operator to depress the push button 34 to move the gate pin 32 to its unlocked position. The illustrated shifter lever assembly 10 includes a roller 36 at each of the two park gates 24 on the opposite sides of the shifter lever 14. It is noted that alternatively a roller 36 can be provided at only one of the park gates 24. It is also noted that rollers 36 can alternatively or additionally be provided at any other suitable gate 24. It is further noted that the roller 36 can alternatively be provided at and carried by the gate pin 32 for engagement with the gate walls 18.

Each illustrated roller 36 is positioned outwardly adjacent the wall 18 of the base 12 and is rotatably secured to the wall 18 so that the roller 36 rotates about a horizontal and laterally extending axis of rotation 46 that is substantially parallel to the pivot axis 20 of the shifter lever 14. The illustrated roller 36 is rotatably supported between the wall 18 and a support wall 48. The support wall 48 is outwardly spaced apart from the base wall 18 to support the roller 36 therebetween. The illustrated support wall 48 is secured by a plurality of pins or pegs 50 that are unitary with the base wall 18 and extend into openings 52 in the support wall 48 but the support wall 48 can alternatively be secured to the base wall 18 in any other suitable manner and/or the roller 36 can alternatively be supported in any other suitable manner. The illustrated roller 36 has unitary axles 54 outwardly extending from each side that extend into coaxial openings 56 in the base wall 12 and the support wall 48 to rotatable support the roller 36. It is noted that the roller 36 can alternatively be rotatable supported in any other suitable manner.

Each illustrated roller 36 is positioned in the forward-rearward direction so that the forward end of the roller 36 extends slightly forward of the gate wall 26 of the park gate 24 so that the gate pin 32 engages the roller 36 rather than the gate wall 26 of the park gate 24 when the gate pin 32 is moved rearwardly toward the park gate 24. The gate wall 26 is preferably provided near the forward end of the roller 36 as protection against overloading. The roller 36 and gate 24 are sized and shaped to deform so that the gate pin 32 will partially engage the gate wall 26 when a relatively large rearward load is applied to the shifter lever 14. This provides protection for the roller 36 which may otherwise be damaged or fail under relatively large loading of the shifter lever 14.

When the operator places their hand on the knob 30, a preload force PF may be intentionally or unintentionally placed on the shifter lever 14 in the rearward direction. This preload force PF causes a reaction force RF in the forward direction as the gate pin 32 engages the park gate roller 36. When the operator depresses the push button 34, the push button 34 downwardly moves the actuator rod 38 against the bias of the spring member 44. The movement of the actuator rod 38 downwardly carries the gate pin 32 from its locked position to its unlocked position below the park gate 24. The contact or engagement between the gate pin 32 and the roller 36 due to the reaction force causes the roller 36 to roll as the gate pin 32 moves downward. It is noted that there may be some slippage or sliding contact between the gate pin 32 and the park gate roller 36 under some conditions but the overall effect of the roller 36 is that there is reduced friction between the gate pin 32 and the park gate 24. Thus, there is reduced force or effort required by the operator to depress the push button 34 when the shifter lever 14 is rearwardly loaded.

Figure 6:
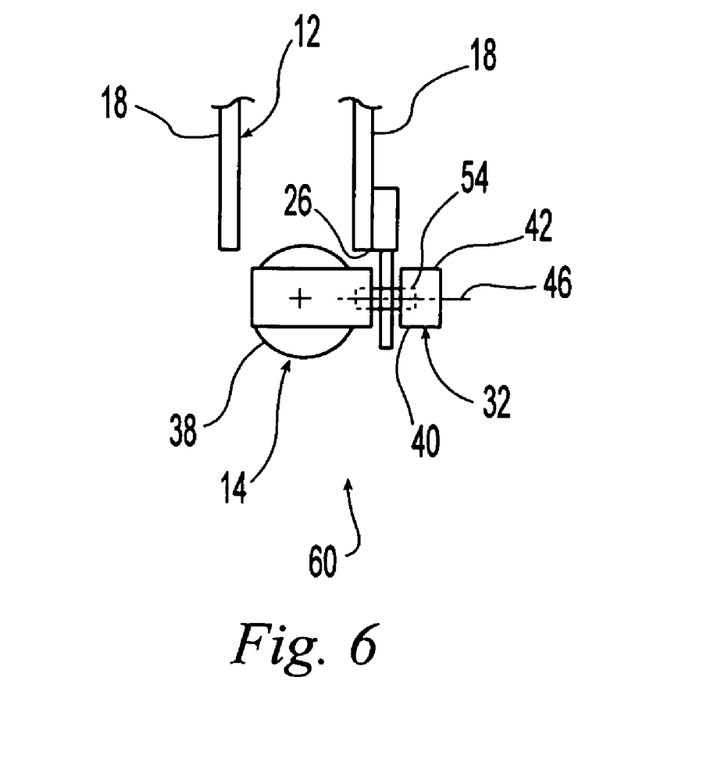
FIG. 6 is an enlarged, fragmented top plan view similar to FIG. 5 but showing an alternative embodiment of the present invention.

FIG. 6 shows a shifter lever assembly 60 for an automatic transmission according to a second preferred embodiment of the present invention wherein like reference numbers are used to indicate like structure. The shifter lever assembly 60 according to the second embodiment illustrates that the roller 36 can be provided at only one of the park gates 24. It also illustrates that the roller 36 can be provided on and carried by the gate pin 32. The illustrated roller 36 is rotatably secured to the gate pin 32 so that the rearward end of the roller 36 engages the gate wall 26 of the park gate 24 when a rearward load is applied to the shifter lever 14. As the gate pin 32 is moved down ward by actuation of the push button 34, the roller 36 rolls along the gate wall 26 with rolling contact. The engagement surfaces 40, 42 of the gate pin 32 are located near ends of the roller 36 to reduce the likelihood of damage of the roller 36 upon excessive loading of the shifter lever 14.

From the foregoing disclosure and detailed description of certain preferred embodiments, it is apparent that the roller significantly reduces friction between the gate pin and the park gate no matter whether the shifter lever is rearwardly loaded intentionally or unintentionally. Thus, there is significantly reduced force or effort required to depress the push button when the shifter lever is rearwardly loaded.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An instrument panel mounted shifter lever assembly for a motor vehicle comprising, in combination:
   a base adapted for mounting in an instrument panel of the motor vehicle;
   a shifter lever pivotably mounted to the base about a laterally extending pivot axis and movable relative to the base along a shift path;
   a plurality of gates defining a plurality of gear positions along the shift path;
   wherein the plurality of gates includes a park gate defining a park gear position along the shift path;
   a release mechanism including:
      a gate pin having a longitudinal length disposed in a lateral direction and parallel to the pivot axis of the shifter lever and movable along a linear path between a locked position wherein the gate pin cooperates with one of the gates to secure the shifter lever in a corresponding one of the gear positions against movement along the shift path and an unlocked position wherein the shifter lever is movable along the shift path;
      an actuator operatively coupled to the gate pin to selectively move the gate pin from the locked position to the unlocked position; and
      a pair of coaxial and spaced-apart rotatable rollers having an axis of rotation parallel to the pivot axis of the shifter lever and located at a fixed position relative to the park gate and near a rear end of the park gate so that longitudinal ends of the gate pin engage the rollers to provide rolling contact when the gate pin is moved from the locked position in the park gate to the unlocked position while a rearwardly directed preload force is applied to the shifter lever by an operator of the motor vehicle; and
   wherein the gate pin is rectangular-shaped in cross-section to define a planar engagement surface for cooperation with the roller.

2. The shifter lever assembly according to claim 1, wherein the actuator is a manual actuator.

3. The shifter lever assembly according to claim 2, wherein a knob is provided at the top of the shifter lever and the manual actuator includes a push button located at the knob.

4. The shifter lever assembly according to claim 3, wherein the push button cooperates with an actuator rod carrying the gate pin to move the gate pin from the locked position to the unlocked position when the push button is depressed.

5. The shifter lever assembly according to claim 4, wherein a spring member resiliently biases the actuator rod such that the gate pin is biased to the locked position.

6. The shifter lever assembly according to claim 1, wherein the park gate is fixed in position relative to the base and the gate pin is carried by the shifter lever.

7. The shifter lever assembly according to claim 1, wherein the park gate includes a gate wall near an end of the roller and the gate pin at least partially engages the gate wall upon deflection of the roller due to loads applied to the shifter lever.

8. An instrument panel mounted shifter lever assembly for a motor vehicle comprising, in combination:
   a base adapted for mounting in an instrument panel of the motor vehicle;
   a shifter lever pivotably mounted to the base about a laterally extending pivot axis and movable relative to the base along a shift path and having a knob at a top end thereof;
   a plurality of gates defining a plurality of gear positions along the shift path;
   wherein the plurality of gates includes a park gate defining a park gear position along the shift path;
   a release mechanism including:
      a gate pin having a longitudinal length disposed in a lateral direction and parallel to the pivot axis of the shifter lever and movable along a linear path between a locked position wherein the gate pin cooperates with one of the gates to secure the shifter lever in a corresponding one of the gear positions against movement along the shift path and an unlocked position wherein the shifter lever is movable along the shift path;
      a manual actuator operatively coupled to the gate pin to selectively move the gate pin from the locked position to the unlocked position; and
      a pair of coaxial and spaced-apart rotatable rollers having an axis of rotation parallel to the pivot axis of the shifter lever and located at a fixed position relative to the park gate and near a rear end of the park gate so that longitudinal ends of the gate pin engage the rollers to provide rolling contact when the gate pin is moved from the locked position in the park gate to the unlocked position while a rearwardly directed preload force is applied to the shifter lever by an operator of the motor vehicle; and
   wherein the manual actuator includes:
      a push button located at the knob that cooperates with an actuator rod carrying the gate pin to move the gate pin from the locked position to the unlocked position when the push button is depressed; and
      a spring member that resiliently biases the actuator rod such that the gate pin is biased to the locked position; and
   wherein the gate pin is rectangular-shaped in cross-section to define a planar engagement surface for cooperation with the roller.

9. The shifter lever assembly according to claim 8, wherein the park gate includes a gate wall near an end of the roller and the gate pin at least partially engages the gate wall upon deflection of the roller due to loads applied to the shifter lever.

10. An instrument panel mounted shifter lever assembly for a motor vehicle comprising, in combination:

a base mounted in an instrument panel of the motor vehicle;

a shifter lever pivotably mounted to the base about a laterally extending pivot axis and movable relative to the base along a shift path and having a knob at a top end thereof;

a park gate defining a park gear position along the shift path;

a release mechanism including:
- a gate pin having a longitudinal length disposed in a lateral direction and parallel to the pivot axis of the shifter lever and movable along a linear path between a locked position wherein the gate pin cooperates with the park gate to secure the shifter lever in the park gear position and an unlocked position wherein the shifter lever is movable from the park gear position along the shift path; and
- a manual actuator operatively coupled to the gate pin to selectively move the gate pin from the locked position to the unlocked position;

wherein the manual actuator includes:
- a pair of coaxial and spaced-apart rotatable rollers having an axis of rotation parallel to the pivot axis of the shifter lever and located at a fixed position relative to the park gate and near a rear end of the park gate so that longitudinal ends of the gate pin engage the rollers to provide rolling contact when the gate pin is moved from the locked position in the park gate to the unlocked position while a rearwardly directed preload force is applied to the shifter lever by an operator of the motor vehicle; and
- a push button located at the knob that cooperates with an actuator rod carrying the gate pin to move the gate pin from the locked position to the unlocked position when the push button is depressed; and
- a spring member that resiliently biases the actuator rod such that the gate pin is biased to the locked position; and wherein the gate pin is rectangular-shaped in cross-section to define a planar engagement surface for cooperation with the roller.

11. The shifter lever assembly according to claim 1, wherein forward side of the park gate does not have a roller engageable by the gate pin.

12. The shifter lever assembly according to claim 1, wherein the park gate is the only one of the plurality of gates along the shift path that is provided with a roller engagable by the gate pin.

13. The shifter lever assembly according to claim 8, wherein forward side of the park gate does not have a roller engageable by the gate pin.

14. The shifter lever assembly according to claim 8, wherein the park gate is the only one of the plurality of gates along the shift path that is provided with a roller engagable by the gate pin.

15. The shifter lever assembly according to claim 10, wherein a forward side of the park gate does not have a roller engageable by the gate pin.

16. The shifter lever assembly according to claim 10, wherein the park gate is the only one of a plurality of gates along the shift path that is provided with a roller engagable by the gate pin.

* * * * *